US010675813B2

(12) United States Patent
Bettermann et al.

(10) Patent No.: US 10,675,813 B2
(45) Date of Patent: Jun. 9, 2020

(54) DEVICE FOR FORMING 3D BODIES (71) Applicant: Homag Bohrsysteme GmbH, Herzebrock-Clarholz (DE)

(72) Inventors: Thomas Bettermann, Bielefeld (DE); Niklas Rasche, Rheda-Wiedenbrück (DE)

(73) Assignee: Homag Bohrsysteme GmbH, Herzebrock-Clarholz (DE)

( * ) Notice: Subject to any disclaimer, the term of this patent is extended or adjusted under 35 U.S.C. 154(b) by 2 days.

(21) Appl. No.: 15/531,216

(22) PCT Filed: Nov. 26, 2015

(86) PCT No.: PCT/EP2015/077756
§ 371 (c)(1),
(2) Date: May 26, 2017

(87) PCT Pub. No.: WO2016/083498
PCT Pub. Date: Jun. 2, 2016

(65) Prior Publication Data
US 2017/0355141 A1   Dec. 14, 2017

(30) Foreign Application Priority Data
Nov. 26, 2014   (DE) .................. 10 2014 224 176

(51) Int. Cl.
*B29C 64/227* (2017.01)
*B33Y 30/00* (2015.01)
(Continued)

(52) U.S. Cl.
CPC .............. *B29C 64/227* (2017.08); *B27N 5/00* (2013.01); *B27N 7/00* (2013.01); *B28B 1/001* (2013.01);
(Continued)

(58) Field of Classification Search
CPC ...................................................... B29C 64/40
See application file for complete search history.

(56) References Cited

U.S. PATENT DOCUMENTS 4,749,347 A * 6/1988 Valavaara ............ G05B 19/41
425/135
4,752,352 A   6/1988 Feygin
(Continued)

FOREIGN PATENT DOCUMENTS

DE        44 22 146 A1    1/1996
JP        S58-211413 A   12/1983
(Continued)

OTHER PUBLICATIONS https://www.youtube.corn/watch?v=4Af8S-suDaU (Year: 2012).*
(Continued)

*Primary Examiner* — Timothy Kennedy
(74) *Attorney, Agent, or Firm* — Wolf, Greenfield & Sacks, P.C.

(57) ABSTRACT

A device for forming 3D bodies, in particular pieces of furniture, by additive material application. In particular, the device has a support, on which the volume body is formed, an application unit, for building up the 3D body on the support by additive application of material, and a tool carrier with a tool holder, in which the application unit is mounted. The tool carrier is in this case designed in such a way that the application unit mounted in the tool holder can be aligned in five directions by moving the tool holder with respect to the support.

19 Claims, 5 Drawing Sheets (51) Int. Cl.
  *B33Y 40/00* (2020.01)
  *B29C 64/106* (2017.01)
  *B29C 64/40* (2017.01)
  *B29C 64/30* (2017.01)
  *B27N 5/00* (2006.01)
  *B27N 7/00* (2006.01)
  *B28B 1/00* (2006.01)
  *B29L 31/44* (2006.01)

(52) U.S. Cl.
  CPC .......... *B29C 64/106* (2017.08); *B29C 64/30* (2017.08); *B29C 64/40* (2017.08); *B33Y 30/00* (2014.12); *B33Y 40/00* (2014.12); *B29L 2031/44* (2013.01)

(56) References Cited

U.S. PATENT DOCUMENTS

| | | | | |
|---|---|---|---|---|
| RE32,817 E | * | 1/1989 | Vossen | B26D 9/00 |
| | | | | 493/1 |
| 5,134,569 A | * | 7/1992 | Masters | B29C 35/08 |
| | | | | 700/182 |
| 5,633,021 A | * | 5/1997 | Brown | B29C 41/36 |
| | | | | 425/375 |
| 5,700,406 A | | 12/1997 | Menhennett et al. | |
| 7,291,002 B2 | * | 11/2007 | Russell | B41J 2/16532 |
| | | | | 425/447 |
| 9,216,544 B2 | * | 12/2015 | Swanson | B33Y 30/00 |
| 9,364,995 B2 | * | 6/2016 | Roberts, IV | B29C 64/106 |
| 2002/0006853 A1 | * | 1/2002 | Susnjara | B23Q 3/15526 |
| | | | | 483/47 |
| 2003/0066574 A1 | * | 4/2003 | Lovchik | B27C 9/00 |
| | | | | 144/382 |
| 2004/0089980 A1 | * | 5/2004 | Owada | B29C 64/106 |
| | | | | 264/308 |
| 2006/0065355 A1 | | 3/2006 | Chiu et al. | |
| 2006/0108090 A1 | | 5/2006 | Ederer et al. | |
| 2008/0001331 A1 | * | 1/2008 | Ederer | B29C 64/165 |
| | | | | 264/460 |
| 2008/0192104 A1 | * | 8/2008 | Nye | B41J 3/4073 |
| | | | | 347/110 |
| 2008/0280028 A1 | * | 11/2008 | Albrecht | B41J 3/407 |
| | | | | 427/8 |
| 2009/0026175 A1 | | 1/2009 | Adams | |
| 2010/0092677 A1 | * | 4/2010 | Ozawa | B41J 3/4078 |
| | | | | 427/275 |
| 2011/0049739 A1 | * | 3/2011 | Uckelmann | A61C 13/0013 |
| | | | | 264/16 |
| 2011/0285060 A1 | * | 11/2011 | Yamamoto | B29C 64/153 |
| | | | | 264/401 |
| 2012/0046779 A1 | * | 2/2012 | Pax | B29C 64/106 |
| | | | | 700/112 |
| 2013/0295338 A1 | * | 11/2013 | Keating | B28D 1/18 |
| | | | | 428/174 |
| 2014/0178585 A1 | * | 6/2014 | Swanson | B05C 13/00 |
| | | | | 427/256 |
| 2014/0306379 A1 | * | 10/2014 | Hartmann | B29C 64/106 |
| | | | | 264/401 |
| 2015/0004274 A1 | | 1/2015 | Ono | |
| 2015/0077215 A1 | * | 3/2015 | Ranky | B29C 70/88 |
| | | | | 338/47 |
| 2015/0176956 A1 | * | 6/2015 | Pettersson | G01B 21/04 |
| | | | | 33/503 |
| 2015/0290741 A1 | * | 10/2015 | Abe | B33Y 40/00 |
| | | | | 419/28 |
| 2015/0290881 A1 | * | 10/2015 | Ederer | B22F 3/1055 |
| | | | | 264/109 |
| 2016/0039194 A1 | * | 2/2016 | Cable | B33Y 80/00 |
| | | | | 428/195.1 |
| 2016/0052206 A1 | * | 2/2016 | Fruth | B29C 64/241 |
| | | | | 425/132 |
| 2016/0257066 A1 | * | 9/2016 | Atwood | B29C 71/04 |
| 2017/0021565 A1 | * | 1/2017 | Deaville | B29C 64/106 |
| 2017/0050379 A1 | * | 2/2017 | Houben | B33Y 10/00 |
| 2017/0113408 A1 | * | 4/2017 | Flik | B33Y 30/00 |
| 2017/0305139 A1 | * | 10/2017 | Hartmann | B33Y 10/00 |

FOREIGN PATENT DOCUMENTS

| | | |
|---|---|---|
| JP | 2013-146936 A | 8/2013 |
| WO | WO 2007/083372 A1 | 7/2007 |
| WO | WO 2009/057107 A2 | 5/2009 |
| WO | WO 2013/180609 A1 | 12/2013 |
| WO | WO 2014/127426 A1 | 8/2014 |

OTHER PUBLICATIONS

Forrest Higgs, Automated Build Platform—MakerBot Industries, https://www.youtube.com/watch?v=A42leYAVtkU , May 11, 2011 (Year: 2011).*

International Search Report for International Application No. PCT/EP2015/077756, dated Feb. 16, 2016.

Written Opinion for International Application No. PCT/EP2015/077756, dated Feb. 16, 2016.

Search Report for German Patent Application No. 102014224176.6, dated Aug. 7, 2015, 20 pages.

[No Author Listed] Lasertec 65 3D: Generative Production in Finished Quality. DMG Mori Seiki Deutschland GmbH. Jul. 2014. 10 pages.

Third Office Action for Chinese Application No. 201580073251.5, dated Sep. 27, 2019.

Office Action for Chinese Application No. 201580073251.5, dated Mar. 17, 2020.

[No Author Listed] Pages from Modern Engineering Design: Manufacturing Technology and Construction Engineering. Jan. 1999:3 pages.

* cited by examiner

DEVICE FOR FORMING 3D BODIES

RELATED CASE INFORMATION

This application is a 371 U.S. National Stage of International Application No. PCT/EP2015/077756, filed Nov. 26, 2015, which claims foreign priority benefits under 35 U.S.C. § 119(a)-(d) or 35 U.S.C. § 365(b) of German application number 10 2014 224 176.6, filed Nov. 26, 2014, each of which is incorporated by reference herein in its entirety.

FIELD OF THE INVENTION

The present invention relates to a device for forming 3D bodies or volume bodies, in particular pieces of furniture.

TECHNICAL BACKGROUND OF THE INVENTION

Document WO 2013/180609 A1 is known which relates to a method and a device for the formation of an object in layers. The formation of bodies in layers belongs to the field of the generative methods and may be associated with the so-called 3D printing.

Especially in recent times, such methods are of growing importance. The increasing economic viability and industrial applicability makes 3D printing play an ever increasing role in prototype development. In the sector of individual manufacturing, the possibilities of 3D printing offer attractive perspectives as well. Above all, this relates to prototypes and the individual production of pieces of furniture and other elements from component industry.

As exemplarily illustrated in the above-cited document, wood dust or wood chips are employed here, which are mixed with a binding agent and then used in an additive manufacturing method for building up a volume body.

In order to be able to also form complicated geometries in such a 3D printing method, e.g. DE 10 2011 106 614 A1 provides a movable object support on which the volume body is formed. In that case, the movement of the object support is controlled with respect to a preferably fixed application unit whereby the material is applied onto the volume body. This allows for the formation of volume bodies with complicated geometries such as undercuts and overhangs.

It is exactly the formation of pieces of furniture and other elements from the components industry, however, which puts special requirements on the corresponding device. By way of example, common pieces of furniture or other components are voluminous and correspondingly heavy in many cases. This significantly impedes the build-up of a volume body by a relative motion of the object support, as the load of the growing volume body strains the mechanical system for moving the object support. Such devices are also subject to limitations in terms of the size of the volume body to be formed. What is more, these 3D printing devices have to be purchased in addition to already existing systems for post-processing the volume body, which enhances the costs of the machine park in a corresponding manner.

Such post-processing may consist, for example, in gluing on an edge material, for which purpose e.g. document EP 2 332 718 A2 discloses a 5-axis machining center having a gluing unit.

DESCRIPTION OF THE INVENTION

The present invention is thus based on the object to provide a device which is able to produce geometrically complex volume bodies such as pieces of furniture and other elements from the components industry by an additive manufacturing method, in fact accompanied by an implementation which is as economic as possible.

To this end, the present invention provides a device according to claim 1. Further preferred embodiments are set out in the dependent claims.

According to one aspect of the present invention, the device for forming volume bodies, in particular pieces of furniture, by additive material application comprises: a support on which the volume body is formed, an application unit for building up the volume body on the support by additive application of material, wherein the material is made in particular partially from wooden material such as wooden foam, wood flour, sawdust or the like, a metallic or mineral paste, or plastics, and a tool carrier comprising a tool holder in which the application unit is mounted. In this arrangement, the tool carrier is designed in such a way that the application unit mounted in the tool holder can be aligned by moving the tool holder with respect to the support in five directions.

The expression "able to be aligned in five directions" means in other words that the application unit mounted in the tool holder can be moved (by moving the tool holder with respect to the support) along or around five axes, i.e. in five different directions.

The term "application unit" in the sense of this application is directed to any unit and equipment capable of carrying out an additive method of forming volume bodies.

The term "volume body" is to be understood as a structural body whose dimensions go beyond a coating consisting of a liquid or solid coating material or an imprinted surface. In particular, the volume body is to have a thickness of at least 500 µm.

The alignment of the application unit with respect to the volume body in five directions ensures that areas can be reached on already formed or printed portions of the volume body which would otherwise be inaccessible, so that also complex geometries with undercuts and overhangs can be formed. The alignment in five degrees of freedom further allows a highly flexible device which is capable of building up volume bodies in most different sizes in an easy way.

The device according to the invention further has the advantage that the volume body is formed on the support and the application unit is aligned with respect to the support (and hence also with respect to the volume body). This means that—for reaching areas on the volume body which are difficult to access—it is not required to move the comparably large support together with the possibly heavy volume body, but only the application unit. This enhances the precision of the device and further results in lower machine cost, as the corresponding means for moving the devices may have a less bulky design. This also permits an economically viable integration of the application unit in existing production lines in which the volume body is transported, for instance, on a conveyor belt.

The additive material for forming volume bodies is in particular a material containing lignin, such wooden material, in particular wooden foam, wood flour, swarf, sawdust, cellulose or the like. The additive material may also be present in the form of metal pastes or foams, plastic pastes or foams, pasty material or electrically conductive materials such as a copper paste or an electrically conductive plastic or electrically conductive bio-materials and bio-plastics. A further alternative is a carbonaceous material. Thermoplastic, thermosetting or elastomeric plastics may also be used. The present invention is not limited to the use of a specific type of material, however. It is also possible to carry out the formation of a volume body in sections with different materials or the materials are mixed prior to their application. In further embodiments, provision is made that the material used for forming volume bodies is aluminum foam, plastic foam etc., in particular for the formation of lightweight building boards.

According to a preferred embodiment, the tool carrier is designed in such a way that a material application by means of the application unit mounted in the tool holder can be carried out with regard to the volume body to be formed on the support from all sides and in particular from below or from obliquely below.

This ensures that the material to be laid on may also be applied in an overhang, such as under the seating surface of a chair. This results in a further improvement of the flexibility of the application.

It is preferred that the tool carrier may further comprise a spindle unit.

Due to the presence of the spindle unit, the flexibility and the economic efficiency of the device is considerably increased, as the device according to the invention may also be used for further treatment processes with other processing tools which need a spindle unit.

According to a preferred further development, the tool holder is arranged on the spindle unit.

This allows, for instance, to use the means for moving or aligning the spindle unit also for the alignment of the application unit arranged in the tool holder (and vice versa), which offers the chance of further reducing the machine costs. It is preferred here if the tool holder arranged on the spindle unit is a tool holder which is configured such that also other processing tools can be mounted therein. Stated in other words, also the application unit is configured such that it can be mounted in the tool holder of the spindle unit. This allows an easy implementation of further post-processing operations on the volume body, while the processing of a geometrically complex body is possible here as well.

According to a preferred embodiment of the device according to the invention, the support is fixed in the vertical position, i.e. cannot be moved upwards and downwards with respect to the tool carrier.

On the one hand, this simplifies the layout of the device and allows, on the other hand, a simpler controlling of the individual components, allowing for the realization of the required precise control by simpler ways and means.

This feature does explicitly not exclude the fact that the support may comprise a conveyor system by means of which the finished volume body may be transported, for example, to a further processing station or into an intermediate storage.

A support aligned at a fixed angle or an upright support is also conceivable, on which the volume body is formed. The 5-axis technology according to the invention allows this.

Regarding the alignment of the application unit with respect to the support, it is advantageous if the tool carrier is configured such that the application unit mounted in the tool holder can be linearly (translationally) moved with respect to the support in three linear directions and can be rotationally moved in two further directions.

This configuration has the advantage that the implementation of the driving software is rather unproblematic. In addition, the separation in translational and rotatory degrees of freedom can ensure that even large volume bodies can be formed by the device without interfering with the structures of the tool carrier.

According to a preferred embodiment, the tool carrier is a cardanic 5-axis spindle head or a Cartesian 5-axis spindle head.

Both embodiments have the advantage that it is relatively easy to implement the application unit in a 5-axis system. This further allows an easy combination and integration of further processing steps such as a grinding process for finishing the volume body.

As a further preferred embodiment for the tool carrier, the tool carrier comprises a support system and a head, wherein the tool holder is attached to the head, the support system is configured such that it can be shifted along three axes with respect to the support, and the head is configured such that it is able to move the application unit mounted in the tool holder by moving/swiveling the tool holder around two further axes with respect to the support.

The head may either be designed as a spindle unit or comprise a spindle unit. If the head is designed as a spindle unit, the latter correspondingly comprises the tool holder.

The advantage of this system is, on the one hand, the robust arrangement which is less susceptible to malfunctions, and on the other hand the possibility to drive the system in a precise and simple way due to the advantageous separation of the degrees of freedom.

According to a preferred embodiment, the device further comprises a supply device which for feeding the material to the application unit is connected to the application unit, wherein the supply device comprises an extruder and/or a hose which can be heated in particular.

The use of a supply device has the advantage that the application unit can be continually supplied with material, allowing for an additive material application without any interruption. The provision of an extruder has the advantage that the material can be uniformly applied with defined properties and without interruption, which is advantageous in particular for the formation of complex geometries. The hose further offers the possibility to realize the supply means so as to be heatable. This in turn has the advantage that the consistency of the material for the additive build-up of the volume body can be adjusted in a highly defined manner.

According to an advantageous further development, the application unit is connected to the extruder via the notably heatable hose.

This offers the possibility to arrange the extruder so as to be separate from the application unit. This makes it possible to ensure that the application unit can be flexibly aligned without having to carry the extruder along. On the one hand, this allows to realize a compact application unit despite the use of the extruder. On the other hand, the alignment of the application unit is not impaired by the extruder which may have a large weight.

It is preferred here that the extruder is attached to the device such that it is moved merely along the three linear directions during aligning the application unit.

Due to the fact that the extruder is integrated in the device such that it is moved solely along the three linear directions (i.e. is not pivoted together with the tool holder around the remaining two rotatory axes), it is ensured that the relatively heavy extruder does not impede the alignment of the application unit around the rotatory axes.

By way of example, this is achieved in that the extruder is attached to the support system mentioned above. As the support system is configured such that it can be shifted with respect to the support along three axes, this means as a consequence that the extruder together with the support system can be moved with respect to the support along three axes. As regards the translational directions (linear movements), the support thus moves together with the support system. This keeps the supply routes for the material for the additive building of the volume body short. The hose represents a flexible connection element which does not impair the alignment of the application unit relative to the extruder.

According to a preferred further development, the supply device also comprises an intermediate storage for the intermediate storing of the material. The intermediate storage is preferably attached to the device such that it is moved merely along the three linear directions during aligning the application unit. If an extruder is provided, the intermediate storage is preferably arranged upstream of the extruder.

Due to the preferred arrangement of the intermediate storage in such a way that it is moved only along the three linear directions during aligning the application unit, it can be prevented that the intermediate storage—which may be heavy and voluminous—hinders the rotatory alignment of the application unit in particular. Hence, this assists the ability of the device to form volume bodies having a complex geometry.

The intermediate storage may serve here as a kind of material buffer which ensures that the application unit is constantly supplied with material. This is especially important for complex volume bodies, because it can be ensured in this way to be able to form especially geometrically complicated areas "in one go" without disruption, which may reduce strains in the volume body. This also allows to ensure consistent material properties for the entire volume body.

If different types of material are to be used for the volume body, also a second supply device for a second material may be provided, the second supply device comprising a separate connection with the application unit. This makes it possible to partially form the volume body from different materials, further facilitating the formation of complex geometries.

According to a preferred embodiment, the application unit comprises one or more nozzles.

The nozzle is in connection with the supply device, for example. In particular, the nozzle may be in connection with the hose or form the end of the extruder. If there are several nozzles, this allows the additive material application of different materials without having to change the tool equipment of the device. This means, for example, that one device is capable of forming (optionally metallic) structures such as conductor paths or fittings which are successively embedded in the volume body. In doing so, each nozzle may have its own supply device (e.g. corresponding hoses, extruders, storage devices, screw conveyors etc.).

As already mentioned, both the application unit and the tool holder are preferably designed in such a way that the application unit can be inserted into the tool holder. This may occur in particular out of a tool magazine which may be arranged in the device as well.

The terms "insertable" and "removable" mean in this context that any process of removing or inserting the application unit can be performed without additional dismantling work and in particular independently of the device. This is to be understood in particular in such a way that the insertion and removal occurs within the machine cycle without interrupting the formation process of the volume body to a significant extent, further facilitating processing operations on a complex volume body.

To this end, known mounting and locking systems such as snap locks or magnetic holders may be used.

According to a further preferred embodiment, the device further comprises one or more post-processing tools which can be inserted into the tool holder (preferably out of a tool magazine), wherein the post-processing tool(s) is/are selected in particular from the group comprising an inkjet print head, a milling unit, a grinding unit, a laser or a drilling unit.

The flexibility of the device according to the invention is still further enhanced by the fact that the most varied operations can be carried out with one and the same device. The laser may be configured here in particular such that it partially heats the volume bodies and in this way prepares it for a further material application. As an alternative, it may also be configured such that it carries out a cutting process on the volume body or applies patterns or inlays on the workpiece.

According to a preferred further development, the device also comprises a support structure which is arranged on the support and configured such that it supports at least sections of the volume body during the additive material application.

The expression "configured such that it supports . . . " means in this context that the support structure has a shape which is in particular suitable for supporting the volume body. This has the advantage that complex geometries can be handled even if the structural integrity of a given structure or intermediate shape could not be ensured by the material properties of the volume body. It is also possible to form volume bodies which could be formed only with difficulty in an additive manufacturing method without the use of such support structures. Further, the time spans required for hardening can be shortened until a new application of material can be performed again.

It is preferred here that the support structure is detachably arranged on the support in such a manner that it can be inserted in the device and removed from it.

This feature further increases the flexibility of the device according to the invention. By way of example, this allows to first provide a support structure and then remove it when it is suitably surrounded by material or the volume body has hardened to a sufficient extent.

To this end, it is advantageous if the support structure is formed such that it can be easily demolded from the volume body.

DETAILED DESCRIPTION OF PREFERRED EMBODIMENTS OF THE INVENTION

Preferred embodiments of the present invention will be described in detail below with reference to the accompanying drawings. Further modifications mentioned in this context can be combined with one another in each case to form new embodiments.

Figure 1:
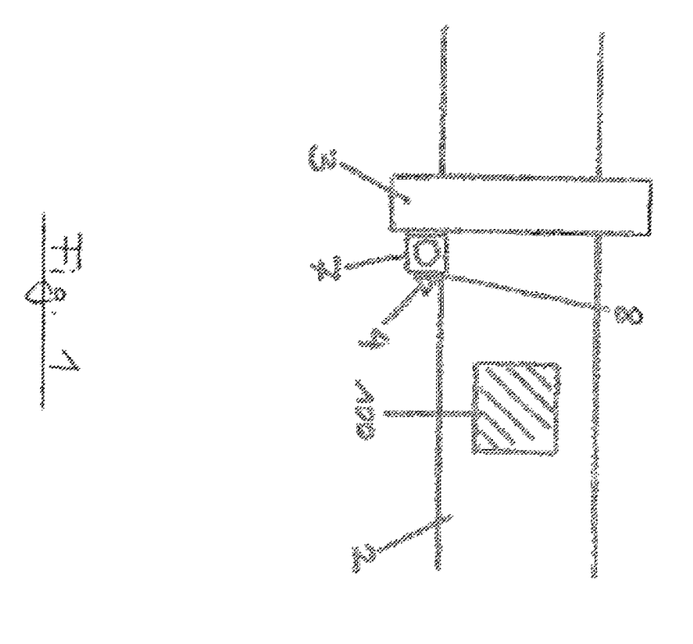
FIG. 1 shows a top view of an embodiment of the device for forming volume bodies according to the present invention.

FIG. 1 illustrates a schematic top view of an embodiment of a device 1 according to the invention for forming volume bodies 100.

The device 1 comprises a support 2 on which the volume body 100 is to build up. According to the invention, the volume body 100 is built up step by step by means of additive material application. To this end, an application unit 4 is provided which is suitable to apply a defined amount of material at a defined position on the support 2 or on the volume body 100.

The material application is performed in an additive manner here. This means that new material is successively deposited on material that has already been applied. Depending on the configuration of the volume body 100, it is advantageous if the material application can be carried out ideally from all sides of the volume body 100. To this end, the device according to the invention comprises a tool carrier 3 which is configured such that the application unit 4 mounted therein can be independently moved and aligned with respect to the support 2 (and hence also with respect to the volume body 100) in five directions. The application unit 4 is mounted here in a corresponding tool holder 8 of the tool carrier 3. This "5-axis tool carrier" even allows to manage, for instance, a material application on the volume body 100 from below or from obliquely below (with respect to the support 2).

This makes it possible to form also complex structures such as undercuts on the volume body 100 without the support 2 having to be designed so as to be movable with respect to the application unit 4 as well. The latter has the advantage that the controlling of the equipment in the device 1 can be simplified. Further, the machining precision during building up the volume body 100 is not impaired by possible adjusting problems between the relative positions of tool carrier 3 and support 2.

Figure 5:
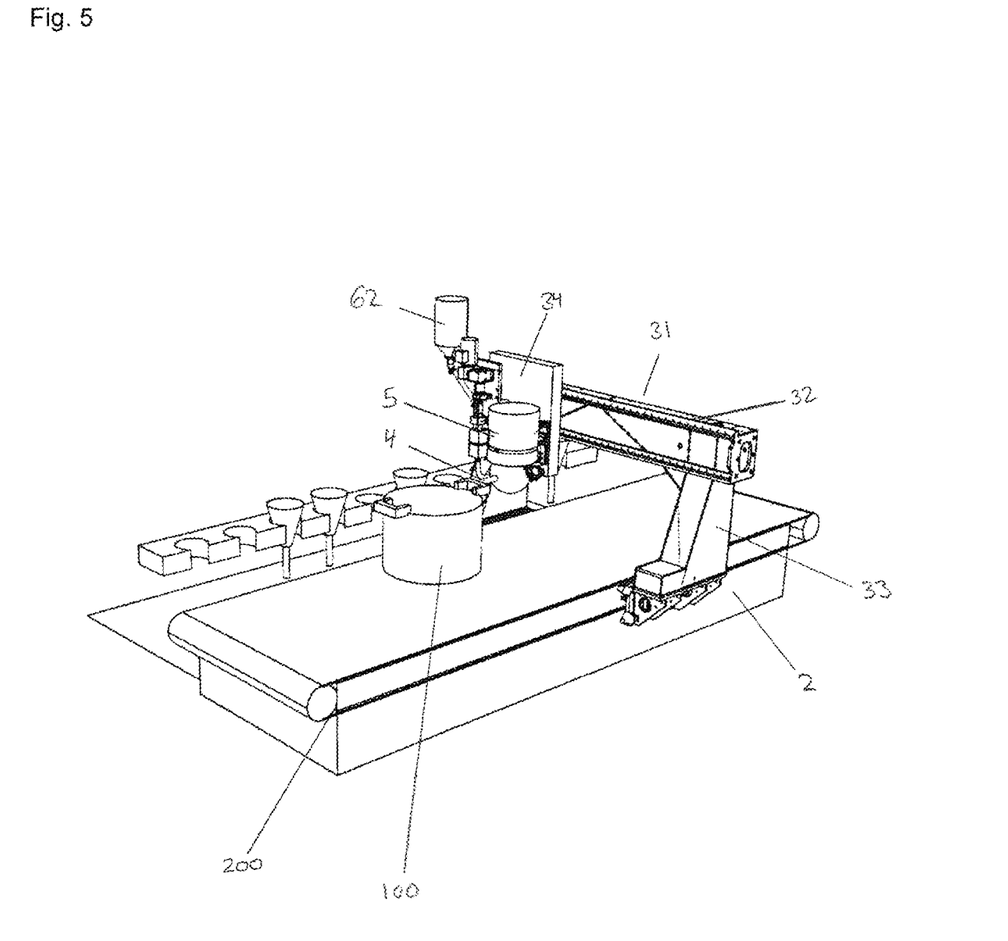
FIG. 5 shows a perspective view of a further embodiment of a device for forming volume bodies including a conveyor system according to the present invention.

This is why it is preferred that the support 2 according to the present embodiment is also fixed in its vertical position, i.e. cannot be moved upwards and downwards with respect to the tool carrier 3. In an advantageous way, the support 2 may indeed comprise, as shown in FIG. 5, a conveyor system 200 such as a circulating belt or a movable table which allows, for example, to transport the finished volume body 100.

The tool carrier 3 also comprises a spindle unit 7 known per se; by way of example, various (post)-processing tools can be inserted in said spindle unit in a corresponding tool holder arranged thereon. The tool holder arranged on the spindle is configured here such that a driving force of the spindle can be transferred to the inserted tool, if required, (if the latter requires to be driven).

In this context, it is preferred that the tool holder 8 for mounting the application unit 4 is the tool holder of the spindle unit 7. The application unit 4 and the tool holder on the spindle unit 7 are then designed such that the application unit 4 can be inserted into the spindle unit 7 instead of other (post)-processing tools of known type. This further means that also the tool holder of the spindle unit 7 can be independently aligned in five directions with respect to the support 2 or the volume body 100. As a whole, this would have the advantage that the infrastructure of already existing systems having 5-axis spindle units may be used. What is more, the modular character and the versatility of the device could be further enhanced at minimum tool costs.

The alignment in five directions can be achieved, for instance, by providing a 5-axis spindle unit as the spindle unit 7. This means that the spindle housing supporting the spindle can be moved in three translatory axes and two rotatory axes, wherein the rotatory axis extends in the present embodiment in the drawing plane of FIG. 1. In this case, the tool carrier is designed in such a way that it allows the alignments around three further axes.

These may be, for instance, three translatory axes (i.e. axes along which a linear movement occurs). The translatory or linear motion along three axes can be achieved here by the configuration of the tool carrier 3 which is shown in FIG. 1 in a top view. The tool carrier 3 comprises a support system 31 including a guide beam 32 which spans the support 2 and is supported at the left and right sides of the support 2 by corresponding pillars 33. This arrangement is also referred to as a portal. The pillars 33 can be moved with respect to the support 2 in its longitudinal direction. Arranged on the guide beam 32 is a blade 34 which can be moved on the guide beam 32 with respect to the support 2 in a transverse direction. This blade 34 has further equipment (including the application unit 4) arranged thereon so as to be movable in upward and downward directions. As an alternative, also the blade 34 itself can be arranged so as to be movable in the vertical direction (upward and downward) with respect to the guide beam 32. In this case, the blade 34 will have an assembly arranged thereon which achieves the alignment of the tool holder 8 around the other two axes. This arrangement will be referred to as head 5 in the following. To this above-mentioned end, the head 5 may comprise a pivot axle, a pivot head, a ball-and-socket mechanism or the like, around which the tool holder 8 or perhaps the spindle of the spindle unit 7 is able to swivel. This generally results in an ability of moving the application unit 4 in five (independent) directions in total with respect to the support 2. This allows to realize free shapes such as spheres and the like for the volume body 100, enhancing the flexibility by a substantial extent.

FIG. 1 illustrates an embodiment in which the tool holder 8 for the application unit 4, as mentioned above, is arranged on the spindle unit 7. As an alternative, the tool carrier 3 may also comprise a separate tool holder 8 for the application unit 4, or the spindle unit may be omitted (as long as it is ensured that the application unit 4 can be aligned with respect to the support 2 in five directions).

Figure 2:
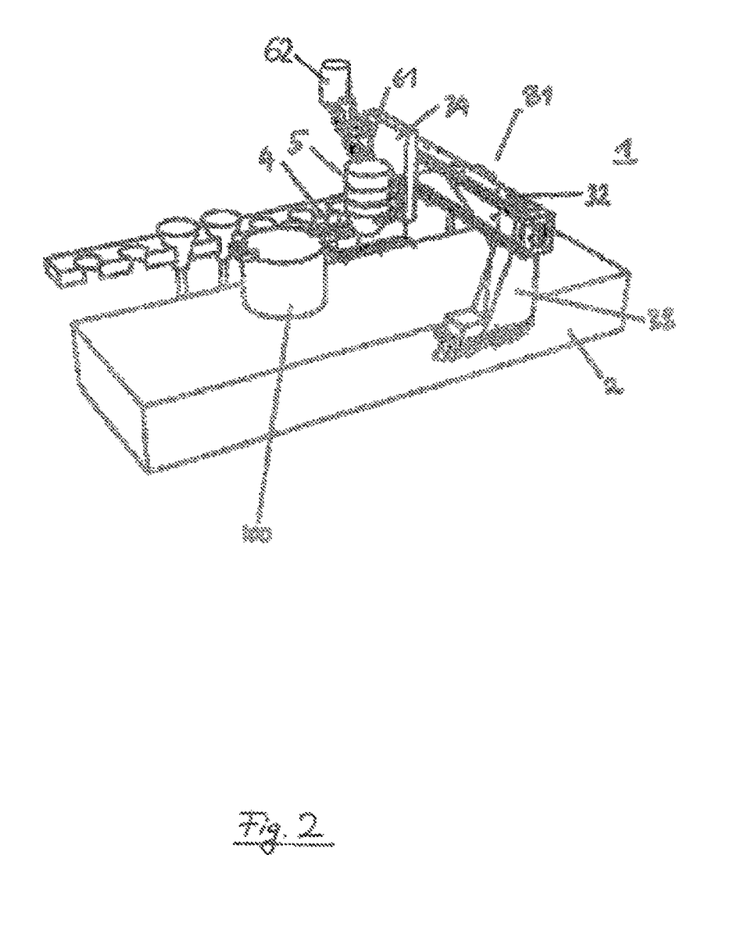
FIG. 2 shows a perspective view of a further embodiment of a device for forming volume bodies according to the present invention.

Such a configuration is illustrated in FIG. 2. Here, a tool carrier 3 similar to the one in FIG. 1 is used. The head 5 does not comprise a spindle unit, however, but the application unit is guided and held by means of a suitable ball-and-socket mechanism which allows an independent alignment around at least two rotatory axes with respect to the support system 31.

In the embodiment illustrated in FIGS. 1 and 2, the tool carrier 3 comprises in each case a support system 31 in a portal-type arrangement comprising a guide beam 32 which spans the support 2 and is fastened at the left and right sides of the support 2 to corresponding pillars 33 which further allow a travelling along the support 2. However, the tool carrier 3 and hence the support system 31 may also be designed as a cantilevered arm which is pivotable with respect to the support 2 and whose length can be adjusted. Further, a configuration comprising a robotic arm for guiding the application unit is also conceivable, said arm being movable around five axes and its head carrying the application unit 4 in a tool holder 8.

In the embodiment shown in FIG. 2, the application unit 4 is formed as a nozzle which is mounted in a protrusion of a ball-and-socket mechanism serving as the tool holder 8. The nozzle is in connection with a supply device 6 which is designed for feeding the material to the application unit or the nozzle. A detailed description of a configuration of said supply device will be given further below with respect to FIG. 4.

In order to further enhance the flexibility of the device, the tool holder 8 may be configured such that further post-processing tools can be inserted therein. To this end, a (not shown) tool magazine may be provided which stores the corresponding tools that are to be inserted. Such a post-processing tool may be in particular an inkjet print head for imprinting the volume body 100. It is possible to provide both a "conventional" imprinting and the printing of functional parts of e.g. circuits. Also a laser may be provided as a further post-processing tool. Regarding the laser, it is conceivable that it is designed in particular in such a way that it is able to partially heat and soften the material of the volume body 100, which may be favorable for a further additive material application in particular if an overhang structure has to be formed. The laser may also be designed such that it is capable of performing a cutting process on the material of the volume body 100. It is further conceivable to keep available an equipment intended for a spot-like hardening of the material and for inserting it into the tool holder 8, by means of which the material can be hardened prior to a further material application. For that purpose, an equipment which emits infrared light may be exemplarily used. For the purpose of precisely controlling the system, it is also conceivable to keep available endoscopic equipment for inserting into the tool holder 8.

Apart from that, it is also possible to provide milling units, grinding units or drilling units as post-processing tools. These interact with the spindle unit of the device in an advantageous way.

Thus, it is conceivable to have a corresponding processing method at one's disposal by means of which the material for forming the volume body is first applied by the application unit 4 situated in the tool holder 8. Subsequently, the application unit 4 may be removed from the tool holder 8 and deposited in the tool magazine, for instance. A suitable post-processing tool will be picked up afterwards, in order to carry out a suitable post-processing on the existing volume body 100. Subsequently, the post-processing tool is again removed from the tool holder 8 and deposited in the tool magazine, for example. This allows to re-insert the application unit 4 in order to carry out a further material application on the volume body 100. As an alternative, it is certainly possible to insert another post-processing tool. The configuration, according to the invention, of the device allows to carry out said operations during the formation of the volume body in a repeated and quick manner.

In case the tool carrier comprises a separate tool holder for the post-processing tools (in addition to the tool holder 4 for the application unit), the exchangeable post-processing tools and the application unit may be kept available in the device even at the same time.

On the whole, this shows that the device 1 according to the invention enables a highly flexible processing of the volume body 100. The 5-axis ability of the device 1 allows to carry out a material application for the generation of the volume body 100 even if complex geometries of the volume body 100 have to be formed. Tilting the support 2 for forming undercuts on the volume body 100 is not required any more, which simplifies the controlling of the device and at the same time offers the chance to increase the machining precision.

Although the device according to the invention allows to form freely shaped bodies for instance with overhangs which cannot be produced with known devices or only with great difficulties, the formation of cantilevered structures has its limits if extreme overhangs have to be formed, in which new material cannot be readily applied onto existing structures which serve as a "support surface". In prior art, this already applies if the angle to the overhang amounts to a minimum of 45° depending on the type of the method. In previous solutions, additional material has been applied for providing starting points for the material application, which had to be broken off or removed in some other way during the finishing process. Such an approach is disadvantageous for several reasons. For one thing, the post-processing is time-consuming and may possibly lower the quality of the finished product. On the other hand, it goes without saying that this way of proceeding involves an additional consumption of material and expenditure of time during printing. For complex geometries, the time required for producing the volume body may indeed be twice the actually required duration (only in terms of the material application).

Figure 3:
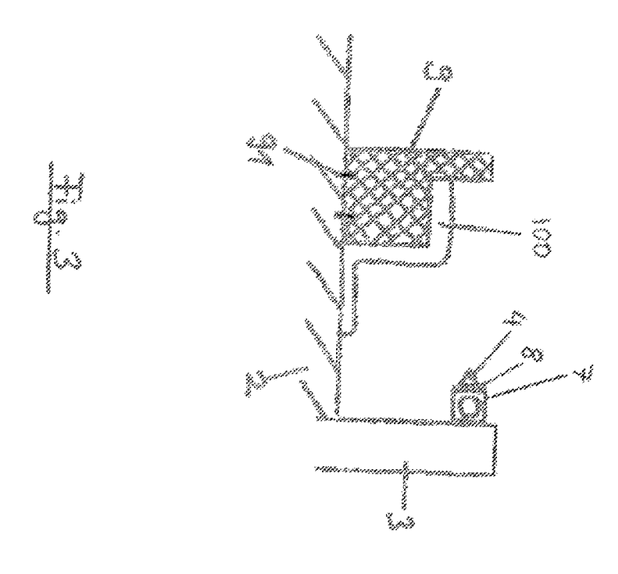
FIG. 3 shows a side view of a further embodiment of a device for forming volume bodies according to the present invention and in particular a support structure arranged in the device.

In order to assist the effect of the 5-axis ability in that regard, a support structure 9 may be additionally used in the device according to the invention. This is schematically illustrated in FIG. 3.

The support structure 9 is configured here such that it supports at least sections of the volume body 100 during the additive material application. This means in particular that the support structure 9 has a suitable shape for supporting the volume body 100. By way of example, this is a negative form of the structure to be achieved. As an alternative, the support structure 9 may merely comprise supports for the punctiform support of the volume body 100.

In order to maintain the modular character of the device 1, it is preferred that the support structure 9 is detachably arranged on the support and can be removed from it in an easy manner. To this end, connection devices are provided in the support 2 and/or the support structure 9, which allow an easy detachment of the support structure and at the same time enable its exact positioning. By way of example, FIG. 3 shows pins 91 which are arranged in corresponding recesses on the support 2 or the support structure 9. As an alternative, magnetic elements may also be used here, for example.

The terms "insertable" or "removable" mean in particular that the insertion or removal can be carried out in line with the machine cycle, i.e. during the material application, so that for instance during the build-up of the volume body 100 a support structure 9 may be provided first, which can then be simply removed at a suitable stage in the process flow without interrupting the formation of the volume body 100.

This process may be possibly favored by shaping the support structure 9 such that it can be easily demolded from the volume body 100. This can be achieved in particular with a non-stick coating of the support structure 9, which has non-stick properties with respect to the material of the volume body 100. As an alternative, a multi-part support structure may be used which acquires an easy demoldability in that the support structure can be removed piece by piece.

The support structure may also serve as a pre-fabricated and reusable contour template which further simplifies the manufacturing process and ensures a consistent product quality.

Figure 4:
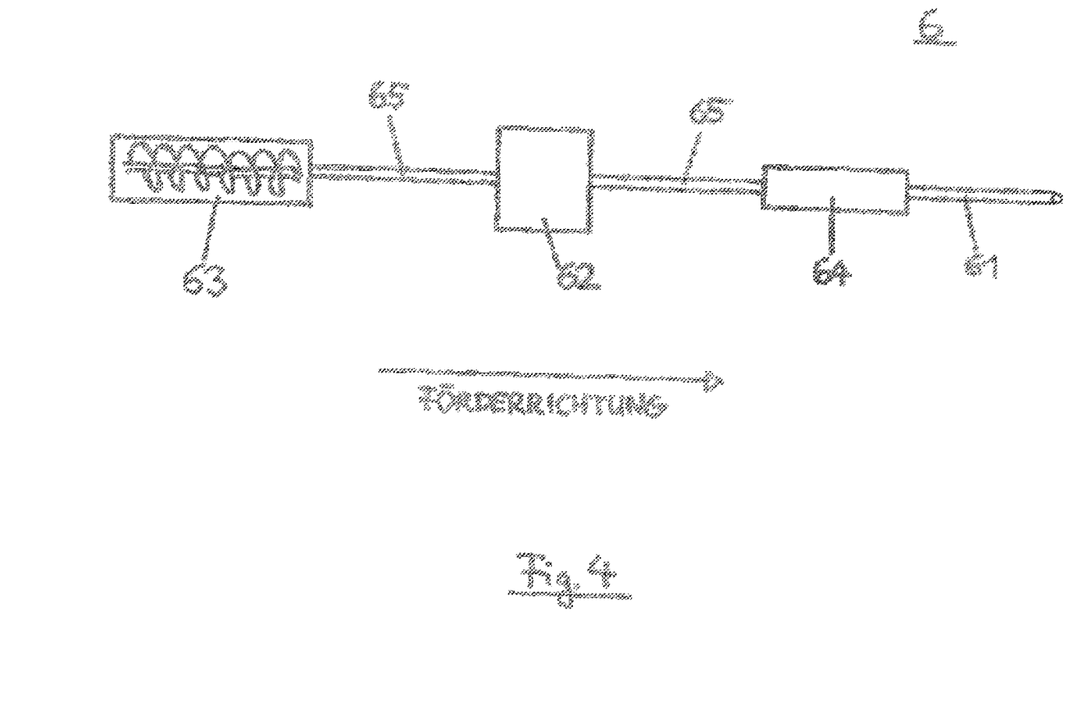
FIG. 4 shows a schematic illustration of a configuration of a supply device in the device for forming volume bodies according to the present invention.

FIG. 4 shows a schematic illustration of the supply device which is in connection with the nozzle of the application unit 4. The supply device shown in FIG. 4 comprises a screw conveyor 63, an intermediate storage (storage device) 62 and an extruder 64. As already mentioned, the supply device 6 is in connection with the application unit 4 which may be formed, for instance, as a shaping opening directly on the extruder 64 or as a nozzle. The application unit 4 may be connected to the supply device 6 via a suitable hose 61 (which is considered in the following as a part of the supply device). On the other side of the application unit 4 as seen in conveying direction (see FIG. 4), the supply device may be in connection with a (not illustrated) main storage which stores the material to be applied or the corresponding raw material in a suitable amount. It is also possible that the material for building up the volume body 100 is prepared in the main storage. This may occur, for instance, by temperature control or the addition of further components, binding agents or additives.

The conveying direction of the material corresponds in FIG. 4 to the direction from left to right. The screw conveyor 63 is capable of conveying the material from the main storage to the intermediate storage 62. From the intermediate storage, the material can then arrive at the extruder 64 which conveys the material at a defined pressure and defined temperature to a shaping opening and squeezes it out of the latter. The shaping opening of the nozzle then acts as the nozzle of the application unit 4.

The elements 62-64 may be interconnected via suitable connection devices 65 through which the material can be conveyed from one element to the other. These connection devices 65 may be flexible hoses or also rigid lines, for example. As an alternative, the individual elements 62-64 may also be directly connected to one another.

The use of the connection devices 65 has the advantage that the elements 62-64 can be flexibly "distributed" over the device and connected to it. This offers an advantage during the manufacture of complex volume bodies, because elements such as the screw conveyor 63, the intermediate storage 62 or the extruder 64, which are heavy and voluminous in many cases, can be arranged on the device in such a manner that they interfere with the alignment of the application unit 4 in five directions as little as possible. In case the elements 62-64 are attached to the device in such a manner that they perform different movements during the alignment of the volume body, i.e. move relative to one another, flexible connection elements such as hoses can be used.

With regard to the 5-axis ability of the device and the formation of complex volume bodies, it is of advantage as mentioned to arrange notably heavy elements of the supply device 6 on the device in such a manner that their extent of movement is as small as possible during the alignment of the application unit 4. On the one hand, this allows a more precise and faster control and application, as the components to be moved have a smaller weight and hence a reduced inertia. On the other hand, this allows to realize the mechanical system for movement so as to be less bulky and thus less expensive. What is more, this allows to give the actual application unit—from which the material is applied on the volume body—a compact design, so that it is possible to reach areas on the volume body which are difficult to access, without the application unit "bumping" against the volume body.

In the embodiment illustrated in FIG. 2, both the intermediate storage 62 and the extruder 64 are arranged on the device in such a manner that they are only moved in the three linear directions during aligning the application unit. The alignment of the application unit around the two rotatory axes is carried out without entraining the intermediate storage 62 and the extruder 64. This has the advantage that, on the one hand, entraining the extruder 64 and the intermediate storage 62 along the linear travel paths can achieve a higher flexibility of the device. On the other hand, it is avoided that these components impair the rotational alignment of the application unit due to their weight.

Between the extruder 64 and the nozzle of the application unit, a flexible hose 61 may be arranged through which the material from the extruder 64 is supplied to the nozzle. For the preparation of the material and for ensuring the flowability of the material, it is further preferred that the hose 61 may be designed so as to be heatable.

As an alternative, each of the elements 62-64 may also be arranged on the device such that it is only moved along the support 2 during aligning the application unit. The elements are then arranged on the support system 31, for example.

However, the extruder 64 may also be mounted in the device such that its shaping opening opens directly into the application unit. In that case, the shaping opening of the extruder is part of the application unit 4 and the extruder is moved together with the application unit with respect to the support.

The conveyance of the material from one element 62-64 (in particular between the intermediate storage 62 and the extruder 64) to another one may occur while using gravity, for instance if the intermediate storage 62 is arranged in the device at a higher level than the extruder 64. As an alternative, it is also possible to provide a (not shown) pump for conveying the material.

The main storage may be stationarily arranged with respect to the alignment of the application unit and be in connection with the application unit 4 via a corresponding supply device. This offers an advantage whenever a large amount of material is needed for building up the volume body 100, which has to be kept ready in a correspondingly large storage, or comprehensive preparation measures are required for the material along with corresponding equipment (such as stirring or temperature control devices). The screw conveyor 63 may be associated to the main storage, i.e. it may likewise be stationary related to the alignment of the application unit.

The configuration of the supply device illustrated in FIG. 4 is to be understood merely as an example. Depending on the selected material, the extruder 64 and/or the screw conveyor 63 and/or the intermediate storage 62 could also be omitted, and the nozzle may be directly supplied with material, if applicable.

The invention claimed is:

1. A device for forming a volume body by additive material application, the device comprising:
    a support;
    an application unit constructed and arranged to build up the volume body by additive application of material, wherein the material is made partially from wooden material, a metallic or mineral paste, or plastics;
    a tool carrier including a spindle unit and a tool holder arranged on the spindle unit, the application unit being mounted in the tool holder, the tool holder constructed and arranged to hold one or more other processing tools therein, the tool carrier being movably mounted to the support;
    wherein the tool carrier is constructed and arranged to align the application unit mounted in the tool holder by moving the tool holder with respect to the support in five directions; and
    wherein the support comprises a conveyor belt constructed and arranged to transport the volume body from the support, wherein the application unit is constructed and arranged to build up the volume body on the conveyor belt.

2. The device for forming a volume body according to claim 1, wherein the support is fixed in vertical position.

3. The device for forming a volume body according to claim 1, wherein the tool carrier is configured such that the application unit mounted in the tool holder is movable with respect to the support in three linear directions and is rotationally movable in another two directions.

4. The device for forming a volume body according to claim 1, wherein the tool carrier is a cardanic 5-axis spindle head or a Cartesian 5-axis spindle head.

5. The device for forming a volume body according to claim 1, further comprising
a supply device connected to the application unit to feed the material to the application unit,
wherein the supply device comprises:
an extruder, and/or
a heatable hose.

6. The device for forming a volume body according to claim 5, wherein the application unit is connected to the extruder via the heatable hose.

7. The device for forming a volume body according to claim 1, wherein the application unit comprises one or more nozzles.

8. The device for forming a volume body according to claim 1, wherein the application unit is insertable into the tool holder.

9. The device for forming a volume body according to claim 1, further comprising:
a post-processing tool which is insertable into the tool holder, wherein the post-processing tool is selected from the group comprising an inkjet print head, a milling unit, a grinding unit, a laser or a drilling unit.

10. The device for forming a volume body according to claim 1, further comprising
a support structure arranged on the support and configured to support at least portions of the volume body during the additive material application.

11. The device for forming a volume body according to claim 10, wherein the support structure is formed to be easily demolded from the volume body.

12. The device according to claim 1, wherein the volume body includes a piece of furniture.

13. The device according to claim 1, wherein the wooden material includes wooden foam, wood flour, sawdust or the like.

14. The device according to claim 1, wherein the tool carrier is constructed and arranged to apply a material via the application unit mounted in the tool holder from below or from obliquely below the volume body.

15. The device according to claim 8, wherein the application unit is constructed and arranged to be inserted into the tool holder from a tool magazine.

16. The device according to claim 9, wherein the post-processing tool is constructed and arranged to be inserted into the tool holder from a tool magazine.

17. The device according to claim 1, wherein the conveyor belt is provided on the support.

18. The device according to claim 1, wherein the tool carrier includes a guide beam which spans the support and a pair of pillars which support the guide beam at opposing sides of the support.

19. The device according to claim 18, wherein the pillars are movable in a longitudinal direction relative to the support.

* * * * *